United States Patent [19]
Fritz et al.

[11] Patent Number: 5,446,809
[45] Date of Patent: Aug. 29, 1995

[54] ALL FIBER WAVELENGTH SELECTIVE OPTICAL SWITCH

[75] Inventors: Daniel J. Fritz, East Longmeadow; Timothy J. Bailey, Longmeadow, both of Mass.; Gary A. Ball, Simsbury, Conn.

[73] Assignee: United Technologies Corporation, Hartford, Conn.

[21] Appl. No.: 311,644

[22] Filed: Sep. 23, 1994

[51] Int. Cl.$^6$ .............................................. G02B 6/28
[52] U.S. Cl. ............................................ 385/17; 385/24; 385/37
[58] Field of Search ....................... 385/16, 17, 24, 37

[56] References Cited

U.S. PATENT DOCUMENTS

| | | | |
|---|---|---|---|
| 3,871,743 | 3/1975 | Fulenwider | 385/17 |
| 4,725,110 | 2/1988 | Glenn et al. | 359/3 |
| 4,900,119 | 2/1990 | Hill et al. | 385/27 |
| 5,007,705 | 4/1991 | Morey et al. | 385/12 |
| 5,043,975 | 8/1991 | McMahon | 359/128 |
| 5,101,460 | 3/1992 | Richard | 385/37 |

OTHER PUBLICATIONS

Technical Digest OFC '91, San Diego, California, Feb. 18–22, 1991, pp. 96–99, W. W. Morey, "Tunable Narrow-Line Bandpass Filter Using Fiber Gratings".

Primary Examiner—Frank Gonzalez
Attorney, Agent, or Firm—Gerald L. DePardo

[57] ABSTRACT

An all fiber wavelength selective optical switch has one or more 1×N input optical couplers 20,120, each having an input signal with a plurality of wavelengths $\lambda_1$, $\lambda_2$, $\lambda_3$. The output signals from the couplers 20,120 are connected to fibers 26,32,126,158 having Bragg gratings impressed therein, each having a central reflection wavelength, and each having a tuner attached thereto for detuning a central reflection wavelength of the gratings from a base wavelength corresponding to a wavelength of the input signal. For a given grating to pass a particular wavelength of the input signal that grating must be detuned. The fibers 26,32,126,158 are also connected to one or more N×1 couplers 66,98 to combine input signals from to different input couplers. The switch allows any combination of input wavelengths from any input signal to be selectively switched to one or more output ports.

10 Claims, 6 Drawing Sheets

ALL FIBER WAVELENGTH SELECTIVE OPTICAL SWITCH

CROSS REFERENCE TO RELATED APPLICATIONS

Copending U.S. patent applications Ser. No. 8/311,333 (still pending), entitled "Efficient Optical Wavelength Multiplexer/De-multiplexer" and Ser. No. 07/311,332 (still pending), entitled "Low Loss Low Reflection Wavelength Selective Optical Switch", both filed contemporaneously herewith, contain subject matter related to that disclosed herein.

TECHNICAL FIELD

This invention relates to optical switches and more particularly to wavelength selective optical switches.

BACKGROUND ART

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system. For example, a single fiber carrying two wavelengths has twice the bandwidth of a fiber carrying a single wavelength.

Also, high speed low-loss communication networks need wholly fiber optic networks as the transmission medium without converting to electronics along the communication path to minimize losses and maximize speed. Thus, the ability to switch optical signals at access nodes or between network rings, without converting from optical signals to electrical signals, and back again, i.e., provide an all- optical network, is desirable.

Currently there are several switch technologies that address these issues such as 1) acousto-optic tunable filters; 2) electro-optic tunable filters; and 3) liquid crystal Fabry-Perot filters. These techniques all work on the principle of polarization diversity which requires laser light to propagate through some birefringement material such as Lithium Niobate or polarization maintaining fiber. Such systems require careful polarization control and run the risk of distortion of the modulated optical signal due to polarization dispersion.

Also, existing wavelength division multiplexers which split the input light having two wavelengths on one fiber to two output fibers, each having one of the input wavelengths, are limited to only two outputs and the wavelengths must not be closely spaced together.

Therefore, it is desirable to have an optical all-fiber wavelength selective switch which guides input light having one or more wavelengths entirely through a communication grade single mode fiber.

DISCLOSURE OF INVENTION

Objects of the invention include provision of an all-fiber wavelength selective optical switch that operates entirely using communication grade single mode optical fiber.

According to the present invention a wavelength selective optical switch includes input optical coupling means, having an input port and at least one output port, for optically coupling an input signal at the input port to at least one output port, the input signal having at least one input wavelength; an optical waveguide attached to each of the at least one output port; at least one optical reflective element located along the optical waveguide, the grating reflecting a predetermined wavelength band of light centered at a predetermined central wavelength and passing all other wavelengths of light over a predetermined wavelength band; the central wavelength being at a base wavelength when the reflective element is not detuned, the base wavelength corresponding to a corresponding wavelength of the input signal; tuning means, attached to the reflective element, for detuning the central wavelength away from the base wavelength so as to pass the corresponding wavelength of the input signal; and thereby allowing any combination of the wavelengths of the input signal to be passed through all of the reflective elements along a given one of the waveguides as an optical output signal along an associated optical output waveguide.

The invention represents a significant improvement over the prior art by providing an N×N switching configuration where each input has a plurality of wavelengths and such wavelengths may be coupled to any, all, or none of the outputs. Furthermore, the invention uses single mode standard communication grade fiber with optical Bragg gratings impressed therein, thus making the device inexpensive and easy to produce. The invention can take a number of different forms including: single input/single output; single input/multiple outputs; multiple inputs/single output; or multiple inputs/multiple outputs. In each configuration each input line has one or more wavelengths and the invention allows for the coupling of any wavelength from any input line or any combination of wavelengths from any input lines to any one or more of the output lines, in its most general or generic form.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
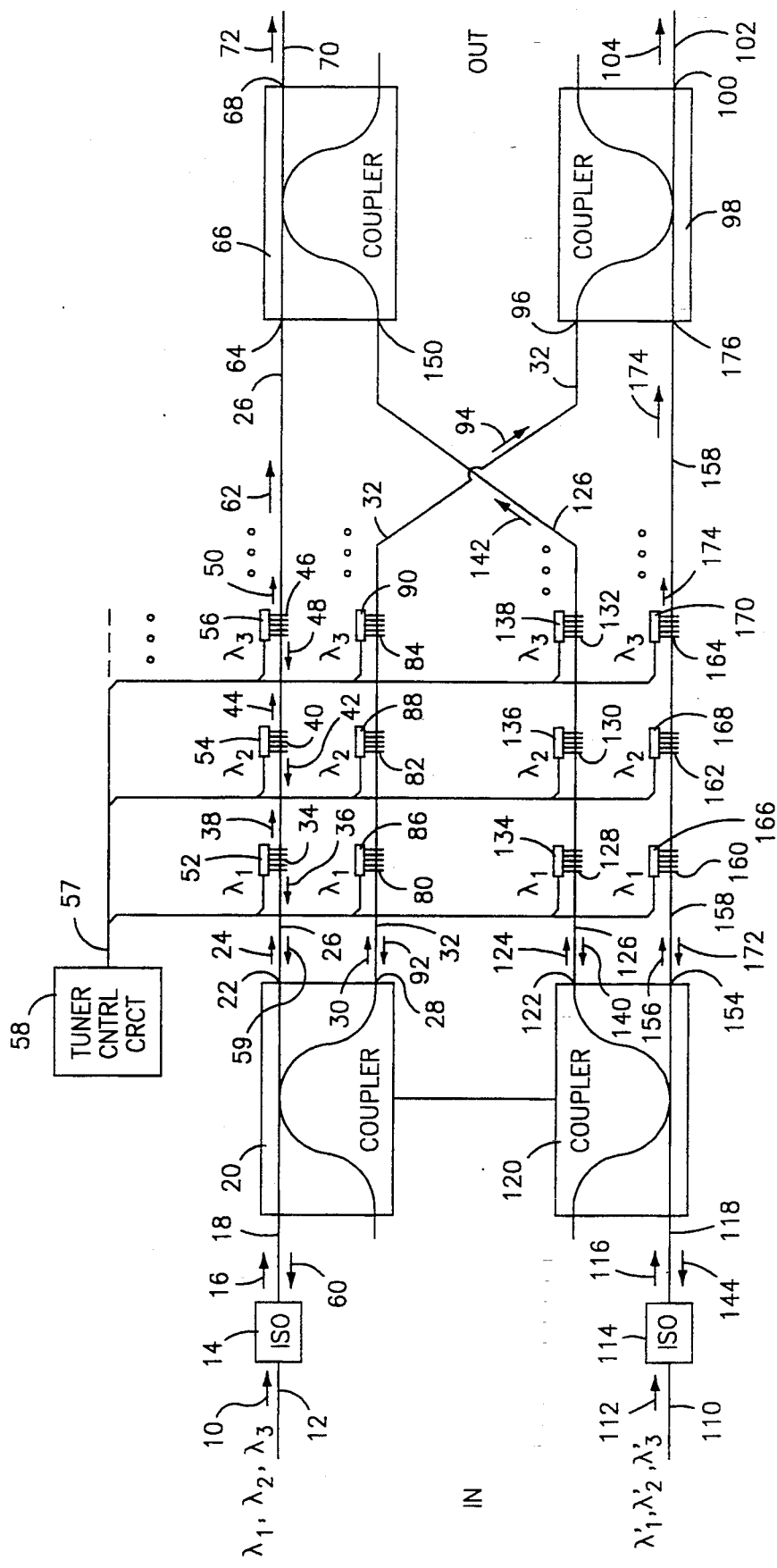
FIG. 1 is a schematic block diagram of a 2×2 wavelength selective all fiber optical switch, in accordance with the present invention.

Referring to FIG. 1, an all fiber, wavelength selective 2×2 optical switch has a first optical input signal 10 which travels along an input port optical fiber 12. The optical signal 10 comprises a plurality of wavelengths $\lambda_1$, $\lambda_2$, $\lambda_3$, each wavelength acting as an optical carrier for analog or digital information in a multi-wavelength communication system. Any number of wavelengths may be used if desired limited only by the overall optical bandwidth of the system and individual grating wavelength width (discussed more hereinafter). The optical fiber 12 is fed to an optical isolator 14 which prevents light from exiting the input line 12 and disrupting the optical components, e.g., lasers, up-stream from the input.

The optical signal 10 exits the isolator 14 as indicated by a line 16 to a 1×2 optical coupler 20 (e.g., a 2×2 coupler configured as a 1×2 coupler in a known way). The coupler 20 couples a predetermined amount, e.g., 50% or 3 dB, of the input signal 16 to an output port 22 as a signal 24 on a fiber 26. The remaining portion, e.g., 50%, of the optical signal 16 exits from a port 28 from the coupler 20 as a signal 30 on a fiber 32. Thus, both output signals 24,30 comprise all the wavelengths of the input signal 10, both having reduced power, e.g., 50%.

The optical signal 24 is incident on a first Bragg grating 34 embedded in the fiber 26. A Bragg grating, as is known, reflects a narrow wavelength band of light centered at a reflection wavelength and passes through all other wavelengths, as described in U.S. Pat. No. 4,725,110, "Method for Impressing Gratings within Fiber Optics," to Glenn et al.

The grating 34 reflects a narrow wavelength band of light 36 centered at a wavelength $\lambda_1$ and passes all remaining wavelengths as indicated by a line 38. The light 38 is incident on a second grating 40 embedded in the fiber 26 which reflects a narrow wavelength band of light 42 centered at a reflection wavelength $\lambda_2$ and passes all remaining wavelengths as indicated by a line 44. Similarly, the light 44 travels along the fiber 24 and is incident on a third grating 46 which reflects a narrow wavelength band of light 48 centered at a reflection wavelength $\lambda_3$ and passes all other wavelengths as indicated by a line 50.

Each of the gratings 34,40,46 on the fiber 26 has a piezo-electric tuner (or PZT) or stretcher 52,54,56 attached to the gratings 34,40,46, respectively. A PZT, as is known, expands with applied voltage and is used herein to stretch Bragg grating, thereby tuning the Bragg grating to a different reflection wavelength or "detuning" the Bragg grating from its original reflection wavelength. The PZT's 52,54,56 are individually controlled by control lines 57 from a tuner control circuit 58. The control circuit 58 contains known electronic components necessary to drive the PZT's and to perform the functions described herein, and is not critical to the invention. Also, any other type of stretcher or tuning device, including a thermal heater, may be used if desired. Some alternative grating tuning devices are discussed in U.S. Pat. No. 5,007,705, entitled "Variable Optical Fiber Bragg Filter Arrangement," to Morey et al.

The light 36,42,48 reflected by the gratings 34,40,46 respectively, are collectively indicated by a line 59 which re-enters the coupler 20 at the port 22 and is coupled to the input fiber 18 as indicated by a line 60.

The signal 60 enters the isolator 14 but does not exit the isolator 14 on the fiber 12 due to the properties of the isolator which are known. Similarly, the light 38,44,50 which is passed through the gratings 34,40,46, respectively, are collectively indicated by a line 62 which travels along the fiber 24 to an input port 64 of a 2×1 3 dB (or 50/50) optical coupler 66 (e.g., a 2×2 coupler configured as a 2×1 coupler in a known way). The coupler 66 couples a predetermined amount (e.g., 50%) of the light 62 to an output port 68 and onto a fiber 70 as indicated by a line 72 which represents one of the output lines of the optical switch of the invention. Other percentages or power ratios may be used if desired.

When each of the gratings 34,40,46 are in their unstretched state, i.e., having their central reflection wavelength at their base wavelengths $\lambda_1$, $\lambda_2$, $\lambda_3$, respectively, the reflected light 59 will comprise all three input wavelengths and the passed signal 62 will not contain these wavelengths. Thus, if the input signal 10 contains only the wavelengths $\lambda_1$, $\lambda_2$, $\lambda_3$, the signal 62 would be 0 or dark. However, when the PZT 52 stretches the grating 34 such that the reflection wavelength shifts from $\lambda_1$ or is "detuned" to some other wavelength, e.g., $\lambda_a$, as indicated by a line 206 in FIG. 2, the reflection signal 59 will now comprise only $\lambda_2$ and $\lambda_3$, and the passed signal 62 will now comprise $\lambda_1$.

Figure 2:
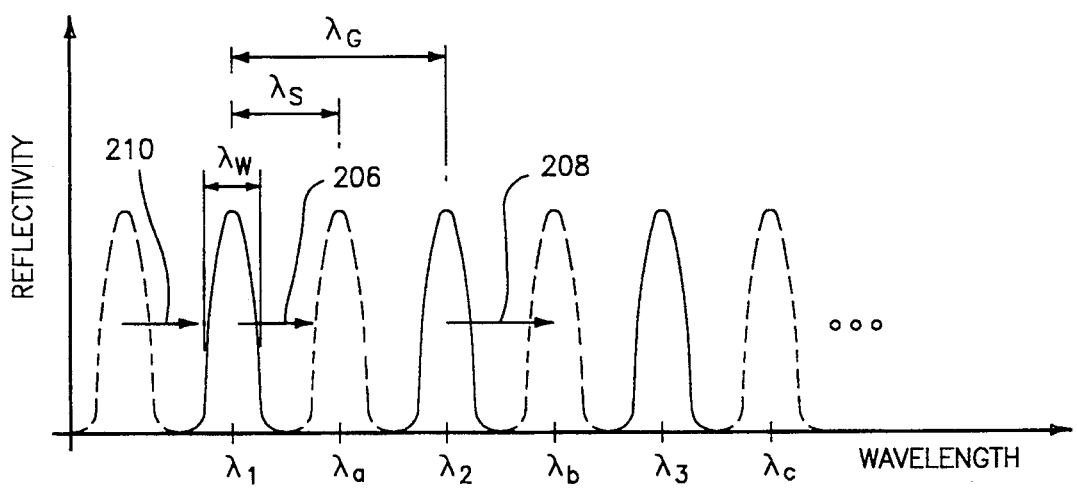
FIG. 2 is a graph of reflectivity against wavelength for a plurality of adjacent Bragg gratings, showing wavelength detuning shifts, in accordance with the present invention.

A similar situation occurs if the grating 40 is also "detuned" by the PZT 54 so as to shift the reflection wavelength $\lambda_2$ to a different wavelength $\lambda_b$, as indicated by a line 208 in FIG. 2. In that case, the reflection signal 59 would contain only the wavelength $\lambda_3$ and the passed signal 62 would comprise the wavelengths $\lambda_1$ and $\lambda_2$. A similar situation occurs for wavelength $\lambda_3$ and the grating 46.

Thus, by "detuning" any one of the gratings 34,40,46 the passed signal 62 will comprise the wavelengths of the gratings which have been detuned. Consequently, the invention in its most fundamental sense can be viewed as a single input, single output multiple wavelength selective switch which allows any one of or any combination of input wavelengths on the input fiber 12 to be coupled to the output fiber 26 based on control lines 57 from the tuner control circuit 58 which individually control the tuners 52,54,56 attached to the gratings 34,40,46 along the fiber 26.

A similar arrangement exists for the fiber 32 where a plurality of gratings 80,82,84 are embedded along the fiber 32, each having a reflection wavelength $\lambda_1$, $\lambda_2$, $\lambda_3$, respectively, and each having a PZT 86,88,90 attached thereto, respectively. Light collectively reflected from the gratings 80,82,84 is indicated by a line 92 and light passed by the gratings 80,82,84 are indicated collectively by a line 94 along the fiber 32. The fiber 32 is fed to a first port 96 of a 2×1, 3 dB (50/50) optical coupler 98 (e.g., a 2×2 coupler configured as a 2×1 coupler in a known way), which couples a predetermined amount, e.g., 50%, of the light 94 to an output port 100 along the fiber 102 as indicated by a line 104.

In another fundamental configuration of the present invention, a single-input dual-output, wavelength selective optical switch is provided at the output signals 62,94 where the outputs would be the fiber 26 and the fiber 32. This would allow any one of or any combination of the input wavelengths $\lambda_1$, $\lambda_2$, $\lambda_3$ to be selectively switched to either the output line 26 or the output line 32 or both.

Because many communication systems allow input signals from different laser optical sources, where each source provides common wavelength carriers, any communication switching network must provide for a plurality of inputs, one from each of such different optical source. Consequently, a second input optical fiber 110 carries a second optical input 112 comprising a plurality of wavelengths, e.g., $\lambda_{1'}$, $\lambda_{2'}$, $\lambda_{3'}$, these being the same wavelengths as those on the first input line 12, however, being from a different source and thus carrying different information on the carrier wavelengths. Line 110 is fed to an optical isolator 114 (similar to the isolator 14) which prevents light from exiting along the input line 110. The signal 112 exits the isolator as the optical signal 116 on a fiber 118. The optical fiber 118 is fed to an optical 1×2 3 dB (50/50) coupler (e.g., a 2×2 coupler configured as a 1×2 coupler in a known way). The coupler 120 couples a predetermined portion (e.g., 50%) of the light 116 to an output port 122 as indicated by a line 124 on a fiber 126.

The light 124 on the fiber 126 is incident on a series of three fiber gratings 128,130,132 impressed in series along the fiber 124. Similar to the gratings on the fibers 26 and 32, discussed hereinbefore, the gratings 128,130,132 have central reflection wavelengths of $\lambda_1$, $\lambda_2$, $\lambda_3$, respectively. Similarly, the gratings 128,130,132 have PZT's 134,136,138 attached thereto respectively, similar to that discussed for the gratings on the fiber 26 and 32. The light reflected by the gratings 128,130,132 is collectively indicated by a line 140 and the light passed by the gratings 128,130,132 is collectively indicated by a line 142. Reflected light 140 re-enters the coupler 120 at the port 122 and a portion (e.g., 50%) exits the coupler onto the fiber 118 as indicated by a line 144. The light 144 is incident on the isolator 114 which prevents the light from exiting the input fiber 112 and disrupting any up-stream optical sources.

The fiber 126, along which the passed optical signal 142 travels, is connected to a second input port 150 of the coupler 66. The coupler 66 couples a predetermined amount, e.g., 50%, of the light 142 to the output port 68 onto the output fiber 70, as indicated by a line 72.

Symmetrically, the coupler 120 couples a predetermined amount, e.g. 50%, of the light 116 to an output port 154 as indicated by a line 156 along a fiber 158. The light 156 is incident on a plurality of gratings 160,162,164 impressed in the fiber 158 in series in a similar fashion to the gratings of the fibers 26,32,126, as discussed hereinbefore. Similarly, each of the gratings 160,162,164 has a central reflection wavelength $\lambda_1$, $\lambda_2$, $\lambda_3$, respectively, and has a PZT 166,168,170 attached thereto, respectively. The light reflected by the gratings 160,162,164 is collectively indicated by a line 172, and the light passed by the gratings 160,162,164 is indicated collectively by a line 174. The reflected light 172 re-enters the coupler 120 at the port 154 and the coupler 120 couples a predetermined amount (e.g., 50%) of the light 172 onto the fiber 118 as also indicated by the line 144. The light 144 enters the isolator 114 which prevents such reflected light from exiting along the input line 110 and disrupting up-stream sources, as discussed hereinbefore.

The passed light 174 travels along the fiber 158 which is fed to an input port 176 of the coupler 98. The coupler 98 couples a predetermined amount (i.e., 50%) of the light 174 to the output port 100 onto the second output fiber 102 as indicated by the line 104. Thus the couplers 66 and 98 act as optical combiners of the signals 62,142 to the output signal 72 and of the signals 94,174 to the output signal 104.

The coupler 120 and the gratings on the fibers 126,158 operate in precisely the same fashion as discussed hereinbefore regarding the coupler 20 and fiber gratings and PZT's attached thereto on the fibers 26,32. In general, when all the gratings on a given fiber are not stretched (or not "detuned"), all the wavelengths of the input signal 112 are reflected for that fiber. Similarly, when one of the gratings is "detuned" so as not to reflect at the unstretched reflection wavelength for that grating, that wavelength will pass through all of the series gratings on that fiber. Additionally, the couplers 66,98 act effectively as optical combiners. In particular, the optical coupler 66 combines the optical passed signal 62 from the gratings 34,40,46 along the fiber 24 and the optical passed signal 142 from the gratings 128,130,132 on the fiber 126, to the output fiber 70 as the signal 72. This allows any of the wavelengths on the first input line 12 to be coupled to the output fiber 70 and/or any of the same wavelengths on the second input line 110 to be coupled to the output fiber 70, having a similar amount of signal loss for both channels.

Similarly, the optical coupler 98 acts as an optical combiner to combine the passed optical signal 94 from the gratings 80,82,84 along the fiber 32, and the passed signal 174 from the fiber gratings 160,162,164 along the fiber 158, to be provided along the second output fiber 102. This allows any of the wavelengths on the first input line 12 to be coupled to the second output line 102, and/or any of the wavelengths on the second input 110 to be coupled to the second output fiber 102. Thus, this configuration, which is also known as a crossbar configuration in electronic networking, provides an optical crossbar switching network which allows any wavelength or combination of wavelengths along any input to be routed to any output, in combination with any wavelengths from any other input.

Referring now to FIG. 2, the wavelength spacing between unstretched gratings on a given fiber, called the guardband $\lambda_G$ (or channel separation), is set at about 0.5 nm, the wavelength shift $\lambda_S$ to detune a given grating is typically to the center of the guardband, e.g., 0.25 nm, and the width of the grating $\lambda_W$ is about 0.1 nm. If using such small values for the guardband $\lambda_G$, wavelength shift $\lambda_S$, and grating width $\lambda_W$, thermal control of the grating may be required. Other values for the guardband $\lambda_G$, wavelength shift $\lambda_S$, and grating width $\lambda_W$ may be used if desired. Also, there is a trade-off on the width $\lambda_W$ of the grating with respect to the jitter (or stability) of the input wavelengths. The more movement which occurs on the input wavelength, the wider the bandwidth $\lambda_W$ of the grating must be to provide good reflection of that wavelength and thus good coupling to the output fiber 152. Further, the narrower the gratings, the more gratings, and hence the more wavelengths that may be switched.

Figure 3:
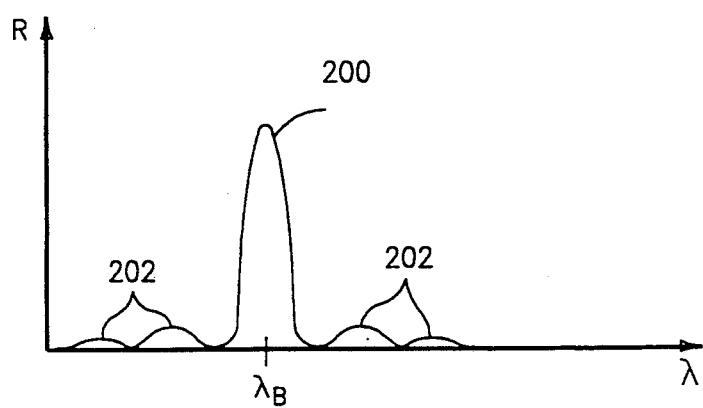
FIG. 3 is a graph of reflectivity against wavelength for a single Bragg grating showing side-lobe reflections, in accordance with the present invention.

There are two forms of loss or crosstalk which exist in the system, both of which are minimal. Regarding the first form of crosstalk or loss, referring to FIG. 3, in addition to a reflectivity peak 200, Bragg gratings generally have side lobes 202 on either side of the peak, which provide some small level of reflection at other wavelengths in addition to the central reflection wavelength $\lambda_B$. The side lobes manifest themselves as losses or crosstalk in the following ways. First, for the base wavelength from which the grating has been detuned, the side lobe may cause reflection at that base wavelength, thereby not allowing 100% of the light to pass to the output. Second, regarding the neighboring grating toward which the detuned grating was shifted, one of two possible effects may occur depending on whether the neighboring grating has also been detuned from its base wavelength. If the neighboring grating has not been detuned, i.e., it is reflecting its unstretched (or base) wavelength, a side lobe which reflects at the base wavelength of the neighboring grating may cause a Fabry-Perot resonant cavity to exist between the two adjacent gratings. If a resonance cavity is created, theoretically the output signal 62 may see some portion of the resonance wavelength, thereby causing crosstalk to exist, i.e., a wavelength which was not intended to be at an output is present. However, because the side lobes are typically small, e.g., down from the reflectivity peak by 10–20 dB, the strength of the resonance signal is small. Alternatively, if the neighboring grating has been de-tuned so as to pass its base wavelength, a side lobe from the first detuned grating which reflects at the base wavelength of the neighboring grating would prevent the neighboring grating's wavelength from being fully passed, i.e., it would add a small amount (e.g., 0.05 dB) to the loss at that wavelength.

The second form of crosstalk or loss relates to the percent reflectivity of a given grating. The amount of light passed by a given grating is directly related to the reflectivity of that grating. Thus, when a grating is positioned so as to reflect a given wavelength such that it will not be seen at the output, some percentage of that wavelength will be seen at the output if the grating is less than 100% reflective at that wavelength. However, because the gratings can be produced at 99% +reflectivity, the amount of crosstalk associated with this aspect of the invention is minimal, e.g., less than 20 dB.

However, if loss or crosstalk due to side lobes are problematic, the grating may be fabricated to reduce the size of the side lobe reflections or, the wavelength guardband $\lambda_G$ (FIG. 2) or spacing between adjacent gratings.

Figure 4:
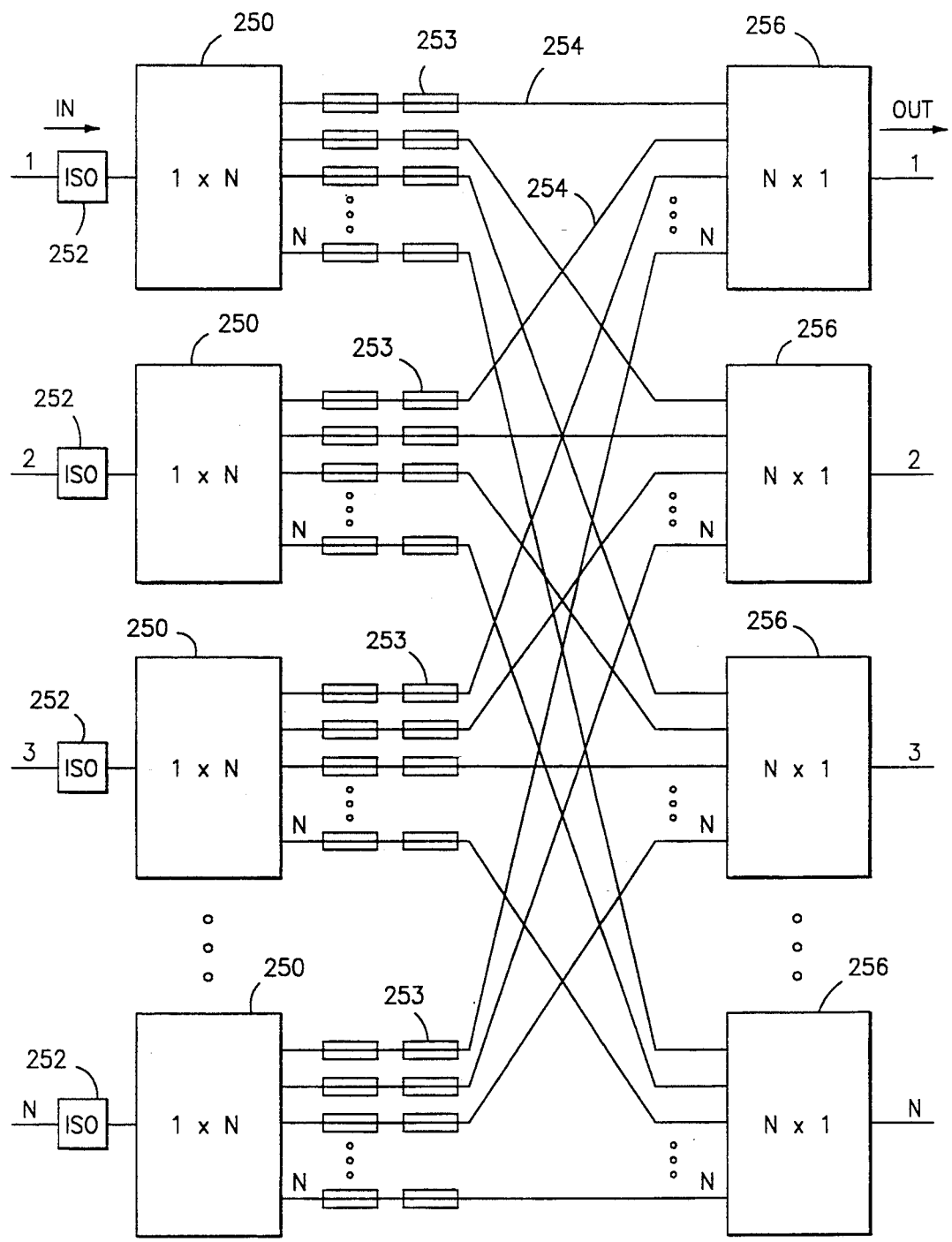
FIG. 4 is a schematic block diagram of an N×N wavelength selective optical switch, in accordance with the present invention.
Figure 5:
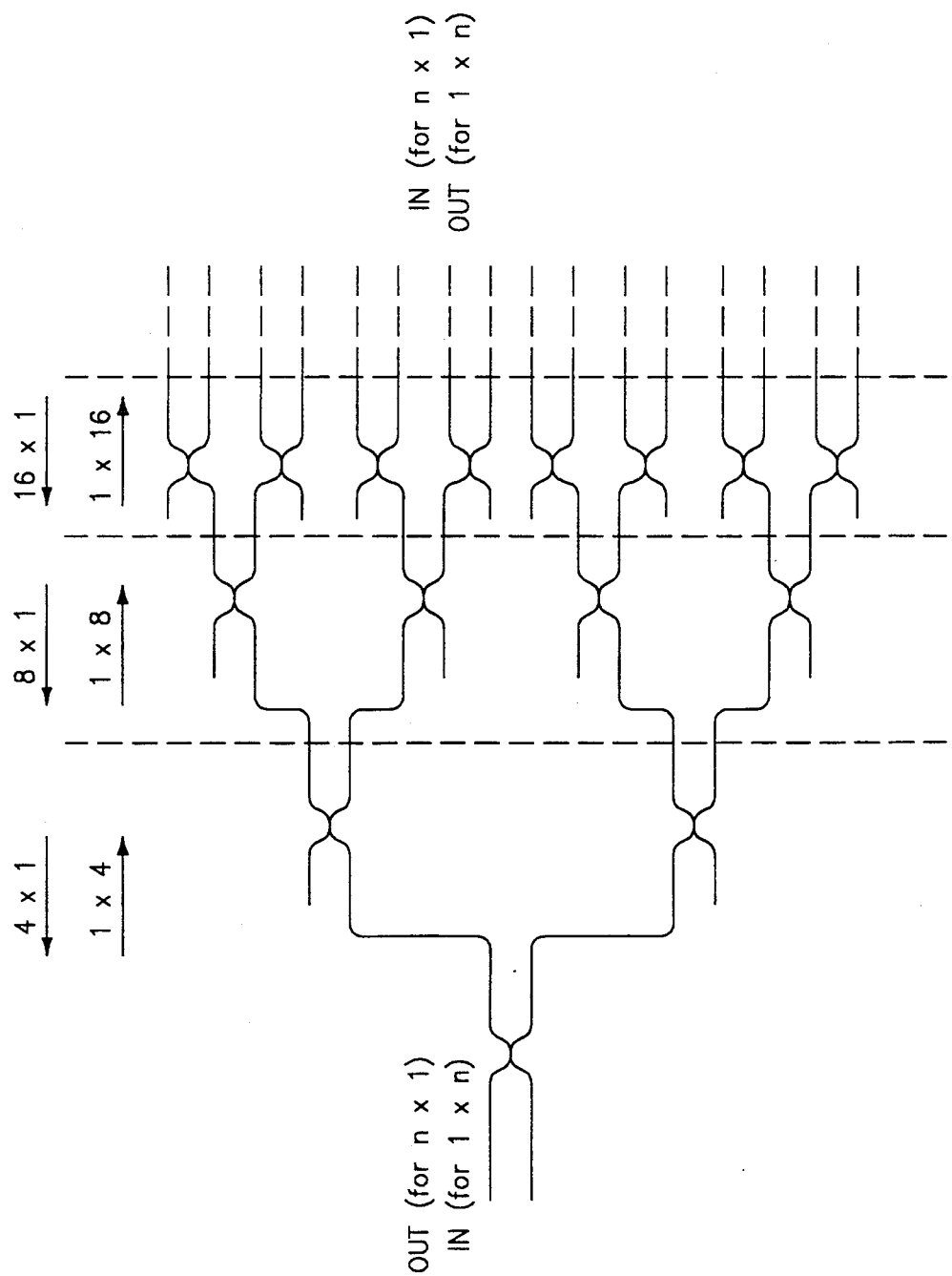
FIG. 5 is a schematic block diagram of a 1×N coupler for use in FIG. 4, in accordance with the present invention.

Referring now to FIG. 4, it can be easily seen by one skilled in the art that the switching arrangement of FIG. 1 may be expanded to any number of input lines and any number of output lines, each line having any number of wavelengths and associated tuners in a similar crossbar-type configuration. In particular, a direct extrapolation may be made from FIG. 1 where instead of the input couplers 20,120 being 1×2 couplers, 1×N couplers 250 may be used as shown in FIG. 4, each having an input isolator 252. Gratings with tuners 253 are located along optical fibers 254 which are connected to the outputs of the 1×N couplers 250. A series of 1×2 couplers (e.g., 2×2 couplers configured as a 1×2 couplers in a known way) may be used to create a 1×N coupler, as indicated in FIG. 5, from left to right. The amount of loss incurred by an input signal depends on the number of coupler stages in the 1×N coupler. For example, for the 1×16 coupler shown in FIG. 5 the input signal incurs four 3 dB losses. Similarly, instead of the output couplers 66,98 of FIG. 1 being 2×1 couplers, N×1 couplers 256 may be used as shown in FIG. 4. Such an N×1 coupler can be configured using a series of 2×1 couplers (e.g., 2×2 couplers configured as a 1×2 couplers in a known way) to couple or combine the signals from a plurality of inputs to a single output similar to that of FIG. 5 looking from right to left. Similar to the 1×N coupler, the amount of loss experienced by the input signals from input to output of an N×1 coupler is directly related to the number of coupler stages.

Figure 6:
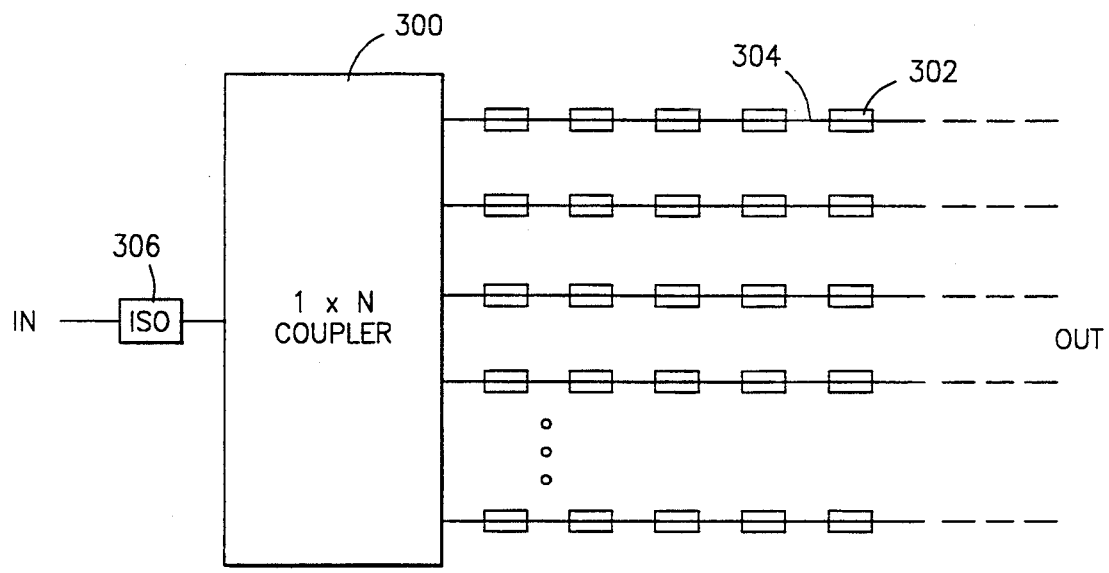
FIG. 6 is a schematic block diagram of a 1×N optical switch, in accordance with the present invention.
Figure 7:
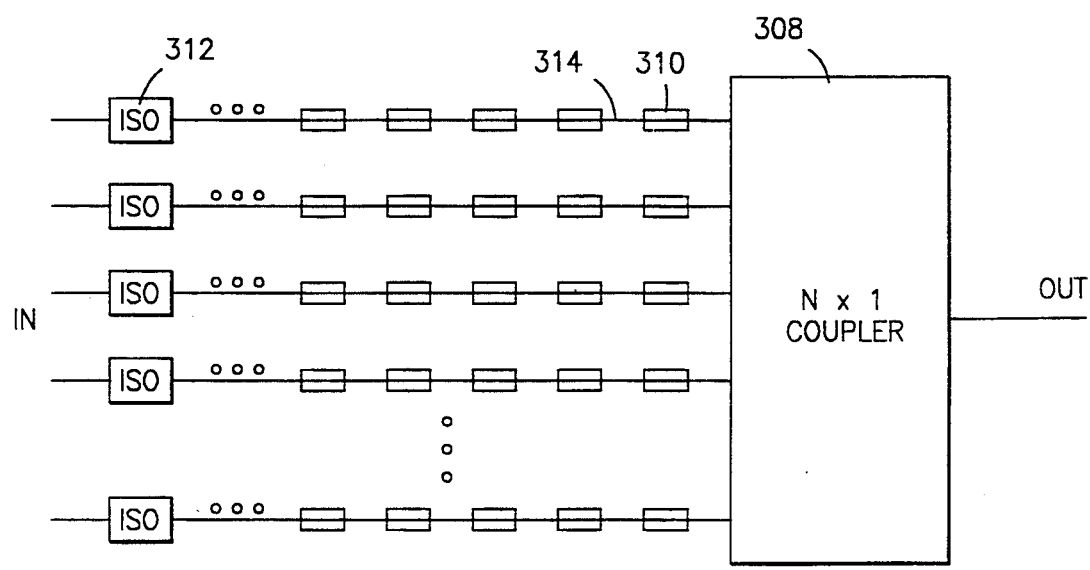
FIG. 7 is a schematic block diagram of a N×1 optical switch, in accordance with the present invention.

Referring now to FIGS. 6 and 7, it should be understood that the invention can be used for a single-input multiple-output switching system, as discussed hereinbefore regarding the embodiment of FIG. 1, by using merely a 1×N coupler 300 and having a plurality of gratings with tuners 302 located along optical fibers 304 at the outputs of the 1×N coupler 300 and an input isolator 306, as shown in FIG. 6. Similarly, the invention may be used as a multiple-input single-output configuration by using merely an N×1 coupler 308 and having the plurality of gratings with tuners 310 and associated isolators 312 located along optical fibers 314 at the inputs to the N×1 coupler 308, as shown in FIG. 7.

Referring again to FIG. 1, a 2×2 optical switch can be configured to be in symmetric or non-symmetric operation. For non-symmetric operation, i.e., to allow each output to not be linked to any other output, a tuner is required for every grating in the system. However, to provide symmetric operation, the outputs are linked to each other and less tuners are required. For example, in symmetric operation, if the output fiber 70 has the wavelength $\lambda_1$, the second output fiber 102 will have the wavelength $\lambda_{1'}$. Similarly, if the output fiber 70 has the wavelength $\lambda_{2'}$ from the input fiber 12, i.e., in a "cross" mode, the output fiber 102 would have the wavelength $\lambda_2$ from the input line 12. In such symmetric operation, the number of tuners (or stretchers) needed will be equal to half the number of gratings. Thus, for the 2×2 three wavelength optical switch shown in FIG. 1 where 12 gratings exist, only 6 tuners would be needed for symmetric operation. More specifically for the switch of FIG. 1, the tuners 86,134, the tuners 88,136, the tuners 90,138, the tuners 52,166, the tuners 54,168, and the tuners 56,170 could be combined as single tuners.

Alternatively, to further minimize the number of grating tuners when in symmetric operation, some of the gratings may have their base (or unstretched) wavelength located away from the input wavelength and are "detuned" to match (or reflect) the input wavelength. In particular, for $\lambda_1$ of the 2×2 switch of FIG. 1, the gratings 34,160 may have their base wavelengths located at the input wavelength $\lambda_1$ and the gratings 80,128 may have their base wavelengths located to the left, or shorter wavelength side, of the input wavelength $\lambda_1$ and detuned to match the input wavelength $\lambda_1$ as indicated by a line 210 in FIG. 2. The opposite gratings may be used if desired e.g., the gratings 80,128 having base wavelength at the input wavelength, and the gratings 34,160 having base wavelength at other than the input wavelength. In such a configuration, all the gratings for a given wavelength would be attached to a single tuner. Thus, in general, when the tuner stretches, it detunes two gratings to match (and thus reflect) the input wavelength and detunes two gratings away from (and thus pass) the input wavelength. Consequently, the number of tuners needed would be one for each wavelength.

Figure 8:
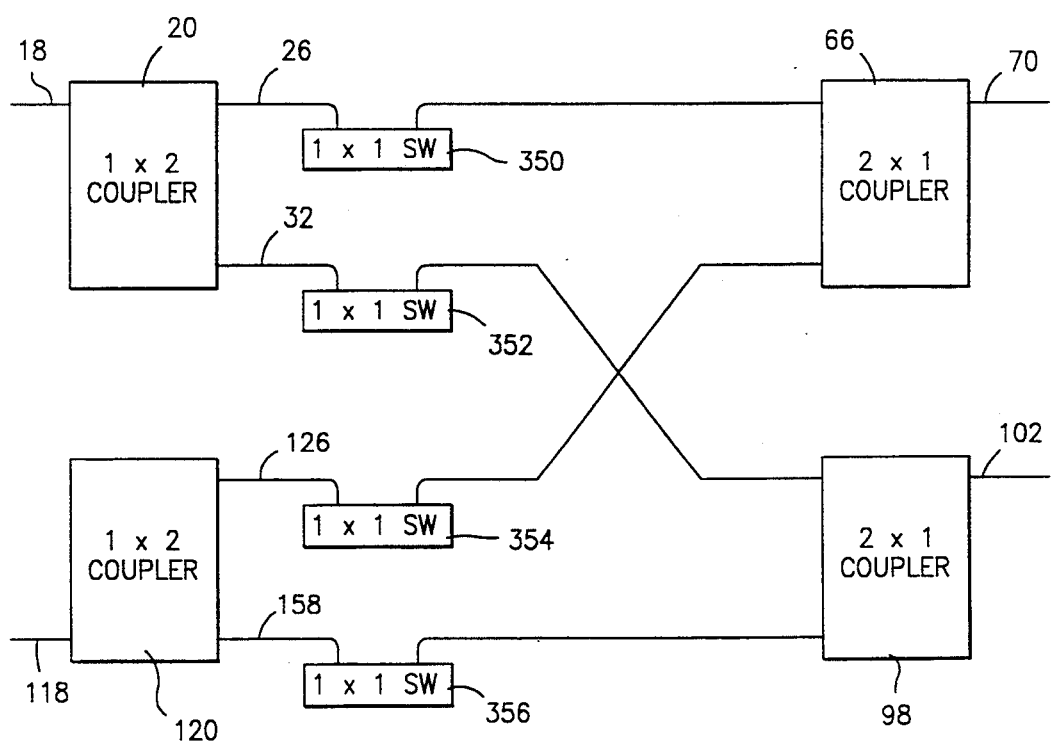
FIG. 8 is a schematic block diagram of a 2×2 optical switch using an efficient 1×1 switch, in accordance with the present invention.

Referring to FIG. 8, to avoid the need for isolators at the inputs to the optical switch, an alternative embodiment may be employed whereby the gratings on the fibers are replaced by 1×1 low reflection Michelson wavelength selective optical switches 350–356 as described in co-pending U.S. patent application Ser. No. 8/311,332 filed contemporaneously herewith. In that case, the isolators 14,114 need not be employed and minimal additional loss is incurred in the optical system due to use of such a switch. This is readily applicable to 1×N, N×1, or N×N switch configurations discussed herein.

It should be understood that instead of optical fiber, the invention will work equally well using any optical waveguide which can support wavelength selective (tunable) reflective gratings. Also, instead of Bragg gratings, any wavelength tunable reflective element that reflects a predetermined wavelength band of light and passes all other wavelengths in the region of interest may be used.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A wavelength selective optical switch, comprising:
   input optical coupling means, having an input port and at least one output port, for optically coupling an input signal at said input port to at least one output port, said input signal having at least one input wavelength;
   an optical waveguide attached to each of said at least one output port;
   at least one optical reflective element located along said optical waveguide, said reflective element reflecting a predetermined wavelength band of light centered at a predetermined central wavelength;
   said central wavelength being at a base wavelength when said reflective element is not detuned, said base wavelength corresponding to a corresponding wavelength of said input signal;
   tuning means, attached to said reflective element, for detuning said central wavelength away from said base wavelength so as to pass said corresponding wavelength of said input signal; and
   thereby allowing any combination of the wavelengths of said input signal to be passed through all of said reflective elements along a given one of said waveguides as an optical output signal along an associated optical output waveguide.

2. The optical switch of claim 1 further comprising:
   a plurality of said input optical coupling means;
   at least one output coupling means, having a plurality of input combining ports each port connected to one of said output waveguides, for combining said output signals and providing a combined optical output signal indicative thereof; and
   thereby allowing any combination of the wavelengths of said input signals of said plurality of said input coupling means to be part of said combined output signal at any of said output coupling means.

3. The optical switch of claim 1 wherein said reflective element is a Bragg grating.

4. The optical switch of claim 1 wherein said input coupling means comprises 1×N optical couplers.

5. The optical switch of claim 1 wherein said output coupling means comprises N×1 optical couplers.

6. A wavelength selective optical switch, comprising:
   input optical coupling means, having an input port and at least one output port, for optically coupling an input signal at said input port to at least one output port, said input signal having at least one input wavelength;
   an optical waveguide attached to each of said at least one output port;
   at least one optical reflective element located along said optical waveguide, said reflective element reflecting a predetermined wavelength band of light centered at a predetermined central wavelength;
   said central wavelength being at a base wavelength when said reflective element is not detuned, said base wavelength being different from a corresponding wavelength of said input signal;
   tuning means, attached to said reflective element, for detuning said central wavelength away from said base wavelength so as to reflect said corresponding wavelength of said input signal; and
   thereby allowing any combination of the wavelengths of said input signal to be passed through all of said reflective elements along a given one of said waveguides as an optical output signal along an associated optical output waveguide.

7. The optical switch of claim 6 further comprising:
   a plurality of said input optical coupling means;
   at least one output coupling means, having a plurality of input combining ports each port connected to one of said output waveguides, for combining said output signals and providing a combined optical output signal indicative thereof; and
   thereby allowing any combination of the wavelengths of said input signals of said plurality of said input coupling means to be part of said combined output signal at any of said output coupling means.

8. The optical switch of claim 6 wherein said reflective element is a Bragg grating.

9. The optical switch of claim 6 wherein said input coupling means comprises 1×N optical couplers.

10. The optical switch of claim 6 wherein said output coupling means comprises N×1 optical couplers.

* * * * *